(12) United States Patent
Legg (10) Patent No.: US 11,952,294 B2
(45) Date of Patent: Apr. 9, 2024

(54) SYSTEM AND PROCESS FOR REMOVING POLYFLUORINATED POLLUTANTS FROM WATER

(71) Applicant: MEMBRANE SYSTEMS AUSTRALIA PTY LTD, Golden Grove (AU)

(72) Inventor: Ricky James Legg, Redwood Park (AU)

(73) Assignee: Enviropacific Services Limited, Macquarie Park (AU)

( * ) Notice: Subject to any disclaimer, the term of this patent is extended or adjusted under 35 U.S.C. 154(b) by 0 days.

(21) Appl. No.: 17/264,402

(22) PCT Filed: Jul. 31, 2019

(86) PCT No.: PCT/AU2019/000091
§ 371 (c)(1),
(2) Date: Jan. 29, 2021

(87) PCT Pub. No.: WO2020/023993
PCT Pub. Date: Feb. 6, 2020

(65) Prior Publication Data
US 2021/0309543 A1 Oct. 7, 2021

(30) Foreign Application Priority Data
Aug. 1, 2018 (AU) .................. 2018902802

(51) Int. Cl.
*B01D 61/14* (2006.01)
*B01D 65/02* (2006.01)
(Continued)

(52) U.S. Cl.
CPC ............ *C02F 1/444* (2013.01); *B01D 61/145* (2013.01); *B01D 61/146* (2022.08); *B01D 65/02* (2013.01);
(Continued)

(58) Field of Classification Search
CPC .................. B01D 61/145; B01D 69/08; B01D 2311/2626; C02F 1/444
See application file for complete search history.

(56) References Cited

U.S. PATENT DOCUMENTS

| 4,369,266 | A | | 1/1983 | Kuhls |
| 5,718,828 | A | * | 2/1998 | Jangbarwala ............ B01J 39/04 521/26 |

(Continued)

FOREIGN PATENT DOCUMENTS

| WO | 2008110166 A1 | 9/2008 |
| WO | 2017069034 A1 | 4/2017 |

OTHER PUBLICATIONS

Pramanik, Biplob Kumar. "Occurrence of perfluoroalkyl and polyfluoroalkyl substances in the water environment and their removal in a water treatment process." Journal of Water Reuse and Desalination 5.2 (2015): 196-210. (Year: 2015).*

(Continued)

*Primary Examiner* — Bradley R Spies
(74) *Attorney, Agent, or Firm* — FisherBroyles, LLP; Craig W. Mueller (57) ABSTRACT

A water treatment system is disclosed. The water treatment system comprises a filtration module comprising one or more ultrafiltration membrane configured to remove one or more non-PFAS contaminant from a PFAS contaminated water stream to provide a partially purified water stream containing soluble PFAS contaminants. The water treatment system also comprises a sorption module comprising one or more sorption units comprising a sorbent material, the sorption module being in fluid communication with the filtration module and downstream therefrom and configured to remove substantially all PFAS contaminants from the (Continued)

partially purified water stream to provide purified water that is substantially free from PFAS contamination.

11 Claims, 5 Drawing Sheets

(51) Int. Cl.
    *B01D 69/02*     (2006.01)
    *B01D 69/08*     (2006.01)
    *B01D 71/34*     (2006.01)
    *C02F 1/28*     (2023.01)
    *C02F 1/44*     (2023.01)
    *C02F 101/36*     (2006.01)
    *C02F 103/00*     (2006.01)
    *C02F 103/06*     (2006.01)

(52) U.S. Cl.
    CPC ............. *B01D 69/02* (2013.01); *B01D 69/08* (2013.01); *B01D 71/34* (2013.01); *C02F 1/283* (2013.01); *B01D 2311/2626* (2013.01); *B01D 2317/04* (2013.01); *B01D 2317/06* (2013.01); *B01D 2321/04* (2013.01); *B01D 2321/16* (2013.01); *B01D 2321/185* (2013.01); *B01D 2325/02* (2013.01); *C02F 2101/36* (2013.01); *C02F 2103/007* (2013.01); *C02F 2103/06* (2013.01); *C02F 2301/08* (2013.01); *C02F 2303/16* (2013.01)

(56) References Cited

U.S. PATENT DOCUMENTS

| | | |
|---|---|---|
| 6,464,877 B1 | 10/2002 | Mori et al. |
| 2014/0048490 A1 | 2/2014 | Roelen et al. |
| 2016/0263529 A1* | 9/2016 | Menozzi .............. B01D 67/002 |
| 2019/0055185 A1 | 2/2019 | Ohashi et al. |

OTHER PUBLICATIONS

Mills, Marc—"PFAS 101: An Introduction to PFAS and EPA Research on PFAS"—Heartland Community Engagement Meeting, Leavenworth KS, 2018 (Year: 2018).*
Written Opinion from parent PCT/AU2019/00091. 6 Pages, dated Oct. 10, 2019.
International Search Report from parent PCT/AU2019/00091, 5 Pages, dated Oct. 10, 2019.

* cited by examiner

SYSTEM AND PROCESS FOR REMOVING POLYFLUORINATED POLLUTANTS FROM WATER

PRIORITY DOCUMENT

This application is a national stage application under 35 U.S.C. 371 and claims the benefit of PCT Application No. PCT/AU2019/000091 having an international filing date of Jul. 31, 2019, which designated the United States, which PCT application claimed the benefit of Australian Provisional Patent Application No. 2018902802 titled "SYSTEM AND PROCESS FOR REMOVING POLYFLUORINATED POLLUTANTS FROM WATER," filed Aug. 1, 2018, the disclosure of each of which are incorporated by reference herein.

TECHNICAL FIELD

The present disclosure relates to systems and processes for treating contaminated water to remove per- and polyfluoroalkyl substances (PFAS) therefrom.

BACKGROUND

Per- and polyfluoroalkyl substances (PFAS), also known as perfluorinated chemicals (PFCs), are a large group of manufactured compounds used in a variety of industries, such as aerospace, automotive, textiles, and electronics, and are used in some food packaging and firefighting materials. PFAS have been released into the environment as a result of the past manufacture and use of PFAS containing materials and PFAS in the environment have entered surface waters, waste water, groundwater, and drinking water wells in many countries. Unfortunately, the hydrophobicity and negligible rate of natural decomposition of PFAS means that they persist in the environment for long periods of time. Even low levels of bioaccumulation of PFAS can lead to serious health consequences for animals exposed to these waters.

To date, a range of solutions have been proposed to address the problem of separating PFAS from PFAS contaminated waters. For example, various sorption or filtration technologies have been proposed. However, to the best of the applicant's knowledge none of the methods proposed to date have been entirely successful, particularly in high throughput environments in which large volumes of water need to be contaminated or in high PFAS concentration waters.

There is thus a need to provide systems and processes that can be used to effectively remove PFAS from contaminated water. Alternatively, or in addition, there is a need to provide systems and processes that overcome or ameliorate one or more problems associated with the use of prior art systems and processes. Alternatively, or in addition, there is a need to provide systems and processes that provide an alternative to prior art systems and processes.

SUMMARY

According to a first aspect of the present disclosure, there is provided a water treatment system comprising:
a filtration module comprising one or more ultrafiltration membranes configured to remove one or more non-PFAS contaminants from a PFAS contaminated water stream to provide a partially purified water stream containing soluble PFAS contaminants;
a sorption module comprising one or more sorption units comprising a sorbent material, the sorption module being in fluid communication with the filtration module and downstream therefrom and configured to remove substantially all PFAS contaminants from the partially purified water stream to provide purified water that is substantially free from PFAS contamination.

According to a second aspect of the present disclosure, there is provided a process for decontaminating PFAS contaminated water, the process comprising:
passing PFAS contaminated water through one or more ultrafiltration membranes under conditions to remove one or more non-PFAS contaminants from the PFAS contaminated water to provide partially purified water containing soluble PFAS contaminants; and
passing the partially purified water through one or more sorption unit comprising a sorbent material under conditions to remove substantially all PFAS contaminants from the partially purified water to provide purified water that is substantially free from PFAS contamination.

BRIEF DESCRIPTION OF DRAWINGS

Embodiments of the present disclosure will be discussed with reference to the accompanying figures wherein.

DESCRIPTION OF EMBODIMENTS

Referring now to FIGS. 1 to 4, there is shown a water treatment system 10. The water treatment system 10 comprises a filtration module 12 and a sorption module 14 in fluid communication with the filtration module 12 and downstream therefrom. The filtration module 12 comprises one or more ultrafiltration membrane 12a, 12b, etc. The ultrafiltration membranes 12a, 12b, etc are configured to remove one or more non-PFAS contaminant from a PFAS contaminated water stream 16 to provide a partially purified water stream 18 containing soluble PFAS contaminants. The sorption module 14 comprises one or more sorption unit 14a, 14b, etc with each sorption unit comprising a sorbent material. The sorption module 14 is in fluid communication with the filtration module 12 and downstream therefrom. The sorption units 14a, 14b, etc are configured to remove substantially all PFAS contaminants from the partially purified water stream 18 to provide purified water 20 that is substantially free from PFAS contamination.

Figure 1:
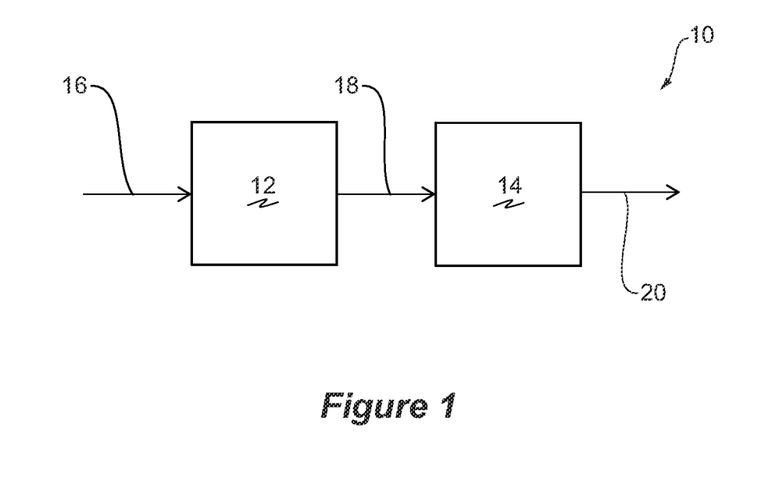
FIG. 1 is a schematic diagram of a water treatment system according to embodiments of the disclosure.

The present inventor has found that a process of ultrafiltration followed by sorption is an efficient, economical and reliable way to separate suspended particles and PFAS from water on a relatively large scale. This is achieved by "tuning" filtration and sorbent modules so that the former removes some non-PFAS contaminants and then the sorbent module is free to adsorb PFAS and other organic materials. Notably, neither of the filtration module 12 or the sorbent module 14 on its own is capable of achieving the requisite level of purification of PFAS contaminated water stream 16.

The water treatment system 10 can be used to treat water from any water source that may be contaminated with PFAS or suspected of being contaminated with PFAS. For example, the water source may be surface water, waste water, groundwater, bore water or a drinking water well. If desired, the presence or amount of PFAS present in water from a water source can be determined using any existing technique for PFAS analysis, including GC, GC-MS, HPLC, HPLC-MS, etc. For example, drinking water can be analysed for PFAS using EPA Method 537 and modified methods based on EPA Method 537 can be used to analyse other water sources.

In certain embodiments, the water treatment system 10 is designed, manufactured, and installed to treat contaminated ground water to remove PFAS and produce purified water 20 that is substantially free from PFAS contamination and suitable for use in a range of applications. For example, the purified water 20 that is produced may be used as irrigation water that is within the irrigation guidelines. Alternatively, the purified water 20 that is produced may be used as potable water, environmental water and/or it may be reinjected into one or more bores. Whilst there generally will not be a requirement for further purification of the purified water 20 produced by the water treatment system 10, it is contemplated that the purified water 20 that is produced by the water treatment system 10 may be further purified using any of the water purification techniques known in the art, such as filtration, distillation, clarification, chemical treatment, etc.

The water treatment system 10 can be configured as a series of units and this means that the amount of water treated can be any amount, with the actual treatment rate depending on the number of units used. For example, in certain embodiments, the water treatment system 10 can be housed in a suitable container(s) with, for example, the filtration module 12 housed in a first twenty foot shipping container and the sorption module 14 housed in a second twenty foot shipping container. Each filtration module 12 and sorption module 14 may be capable of treating up to 2,000 KL/day. Any number of filtration modules 12 and sorption modules 14 (for example in their respective shipping containers) can be connected to one another to increase the production capacity of the water treatment system 10. In certain embodiments, the water treatment system 10 can be used to treat up to 10 KL per hour of bore water or 200 KL/day over a 24-hour period.

Figure 3:
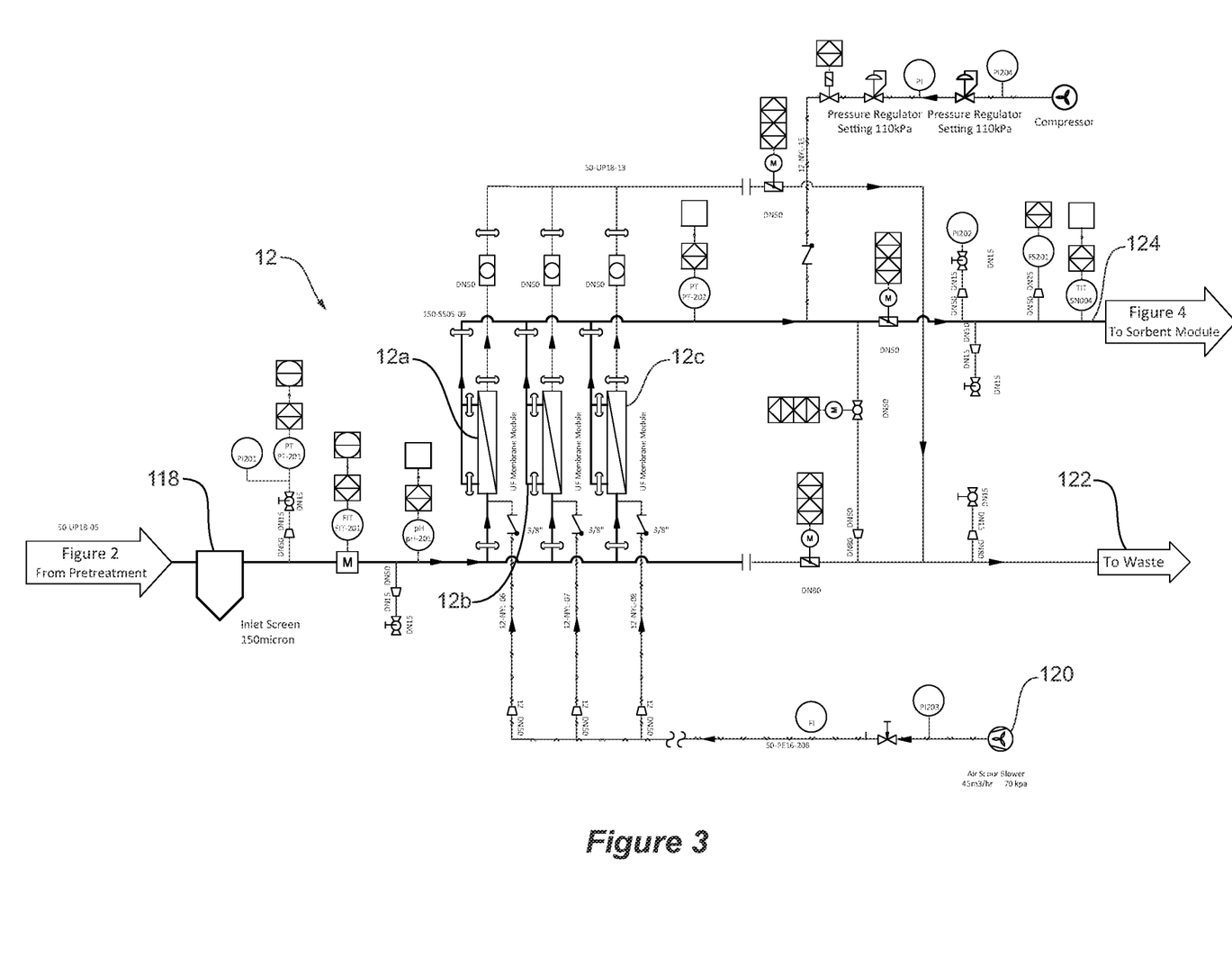
FIG. 3 is a schematic diagram of a filtration module of a water treatment system according to embodiments of the disclosure.

The filtration module 12 comprises one or more ultrafiltration ("UF") membranes 12a, 12b, etc. configured to remove one or more non-PFAS contaminants. The, or each, ultrafiltration membrane 12a is a particle separation membrane. The ultrafiltration membrane 12a may have various types of physical and chemical parameters. For example, the ultrafiltration membrane 12a may have a pore size in the range of 0.003 to 0.1 µm, such as a pore size of about 0.08 µm.

In certain embodiments, the ultrafiltration membrane 12a has a hollow fibre configuration with outside-in or inside-out filtration mode. In alternative embodiments, the ultrafiltration membrane 12a has a flat sheet configuration. In still other embodiments, the ultrafiltration membrane 12a has a tubular configuration. In still further embodiments, the ultrafiltration membrane 12a has a multi-bore structure.

The, or each, ultrafiltration membrane 12a may be polymeric, ceramic or stainless steel. For example, the, or each, ultrafiltration membrane 12a may be a polyvinylidene fluoride (PVDF) membrane. The, or each, PVDF ultrafiltration membrane 12a may be of the type that is formed by low-temperature thermally induced phase separation (LT-TIPS). Suitable membranes include those available under the brand name HYDRAcap® MAX from Hydranautics—A Nitto Group Company.

The filtration module 12 may comprise from about three to about thirty ultrafiltration membranes 12a, 12b, etc connected in parallel. In the illustrated embodiments, the filtration module 12 comprises three ultrafiltration membranes 12a, 12b and 12c. The ultrafiltration membranes 12a, 12b and 12c are connected in parallel.

The PFAS contaminated water stream 16 is passed through the, or each, ultrafiltration membrane 12a using a positive or negative pressure.

The, or each, ultrafiltration membrane 12a is used to remove one or more non-PFAS contaminant from a PFAS contaminated water stream 16 only and should not be used for the removal of oil and grease or any other gross pollutant. Optionally, the type and amount of PFAS contaminated water stream 16 and any chemical addition processes should be monitored and controlled to achieve optimal operational performance of the or each ultrafiltration membrane 12a.

Without intending to be bound by any specific mechanism of action, the applicant proposes that the filtration module 12 removes some contaminants that would otherwise be adsorbed in the sorbent module 14 or would foul the sorbent module 14, thereby leaving the sorbent module 14 free to adsorb PFAS and other soluble organic matter.

The, or each, ultrafiltration membrane 12a can optionally be backwashed to remove solids from the membrane surface. The step of backwashing may be carried out by air scouring while the membranes are full of water followed by draining the membranes out the bottom feed port under gravity. During this process air pressure is applied to the filtrate side of the membrane to ensure nothing passes through the membrane and to ensure a barrier is in place. Once the backwash is complete, a forward flush can be performed to remove any remaining contaminants and remove any air trapped on the outside of the fibres followed by a filtrate flush.

In certain embodiments, the, or each, ultrafiltration membrane 12a may be subjected to a chemically enhanced backwash (CEB). The requirement for or frequency of a CEB is dependent on the feed water quality. The CEB can be performed using feed water (e.g. PFAS contaminated water stream 16) with either an acid or a base combined with an oxidant added to more effectively clean contaminants from the membrane surface. Suitable acids for this purpose include, but are not limited to, citric acid and suitable oxidants for this purpose include, but are not limited to, chlorine. The person skilled in the art will appreciate that a range of acids and oxidants are available that could be used in the CEB process. The soak may be performed for 5 to 30 minutes to allow time for the oxidant to react with contaminants that have attached to the membrane surface or penetrated the fibre wall. After the soak a forward flush can be performed to remove any remaining contaminants on the outside of the fibres.

Alternatively, the, or each, ultrafiltration membrane 12a may be subjected to a backwash using treated water obtained from the water treatment system 10 or from some other source.

Alternatively, or in addition, the, or each, ultrafiltration membrane 12a may be subjected to a clean in place (CIP) operation whereby the, or each, ultrafiltration membrane 12a is manually cleaned.

In use, at initial start up the filtration module 12 is flushed using a "forward flush" to remove any residual chemicals or trapped air from the, or each, ultrafiltration membrane 12a. The flush occurs on the outside of the fibres and does not filter the feed water to make permeate. After the forward flush is discontinued the filtration module 12 can be placed in the operating mode. An operating cycle may range from 15 to 45 minutes. While operating, 100% of the feed water is converted to filtrate, as contaminants are removed during the operating step the transmembrane pressure will rise. At the end of the pre-set operating cycle time, a backwash sequence can be triggered.

Optionally, the, or each, ultrafiltration membrane 12a can be subjected to an integrity test to ascertain whether any fibres in the membrane are broken or damaged. Many applications may only require an integrity test if a loss in performance has been detected, i.e. measured filtrate turbidity is not meeting effluent requirements. In other applications, such as potable water, it may be required to perform an integrity test every day regardless of the effluent performance. An integrity test uses oil free air at 1 bar (15 psi) and determines the air loss limits over a fixed period.

Figure 4:
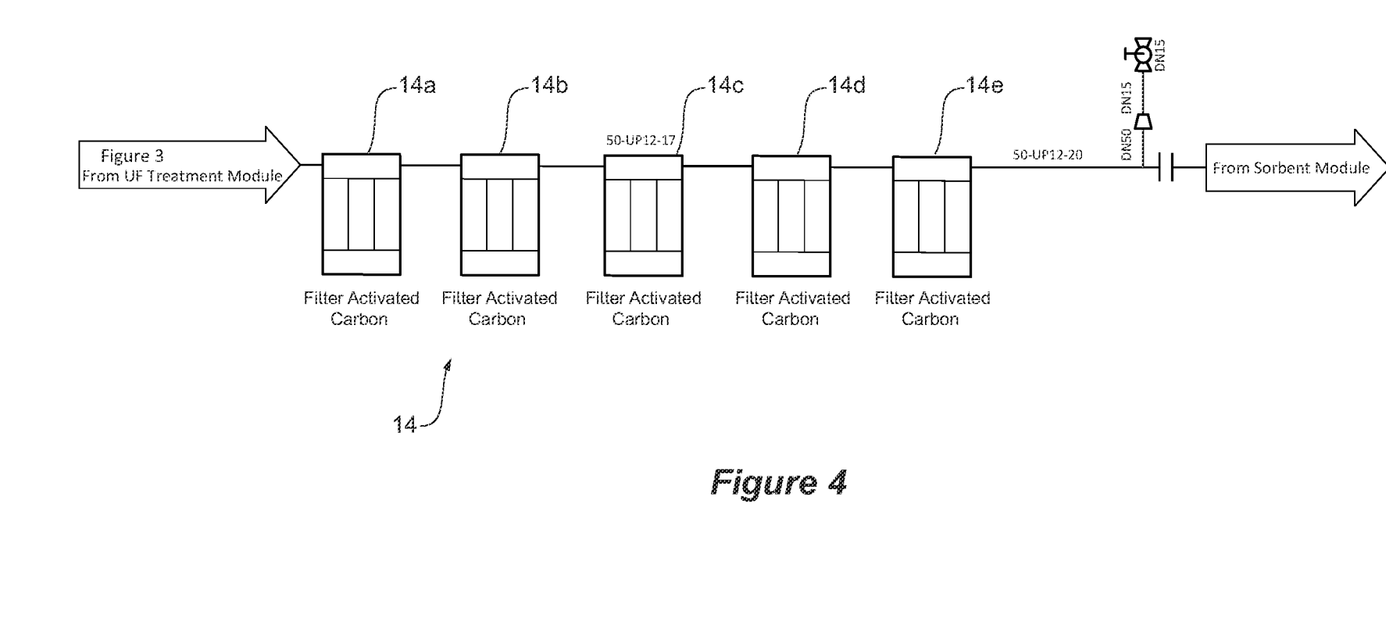
FIG. 4 is a schematic diagram of a sorbent module of a water treatment system according to embodiments of the disclosure.

The partially purified water stream 18 containing soluble PFAS contaminants obtained from the filtration module 12 is transferred to the sorption module 14. The sorption module 14 comprises one or more sorption units 14a, 14b, etc configured to remove substantially all PFAS contaminants from the partially purified water stream 18. The, or each, sorption unit 14a, 14b, etc comprises a sorbent material. The sorbent material is activated carbon, such as coal based activated carbon. The activated carbon is granulated activated carbon (GAC). In certain embodiments, the sorption units 14a, 14b, etc are commercially available from Aquacorp Pty Ltd under the brand name ALCOL-L60.

In the embodiment illustrated in FIG. 4, the sorption module 14 comprises five sorption units 14a, 14b, 14c, 14d, and 14e. The sorption units 14a, 14b, 14c, 14d and 14e are connected in series. The partially purified water stream 18 runs through the sorption units 14a, 14b, 14c, 14d, and 14e in series to increase sorbent contact with the water. In certain embodiments, the retention time for water in the sorption module 14 is at least 25 to 30 minutes EBCT.

Figure 5:
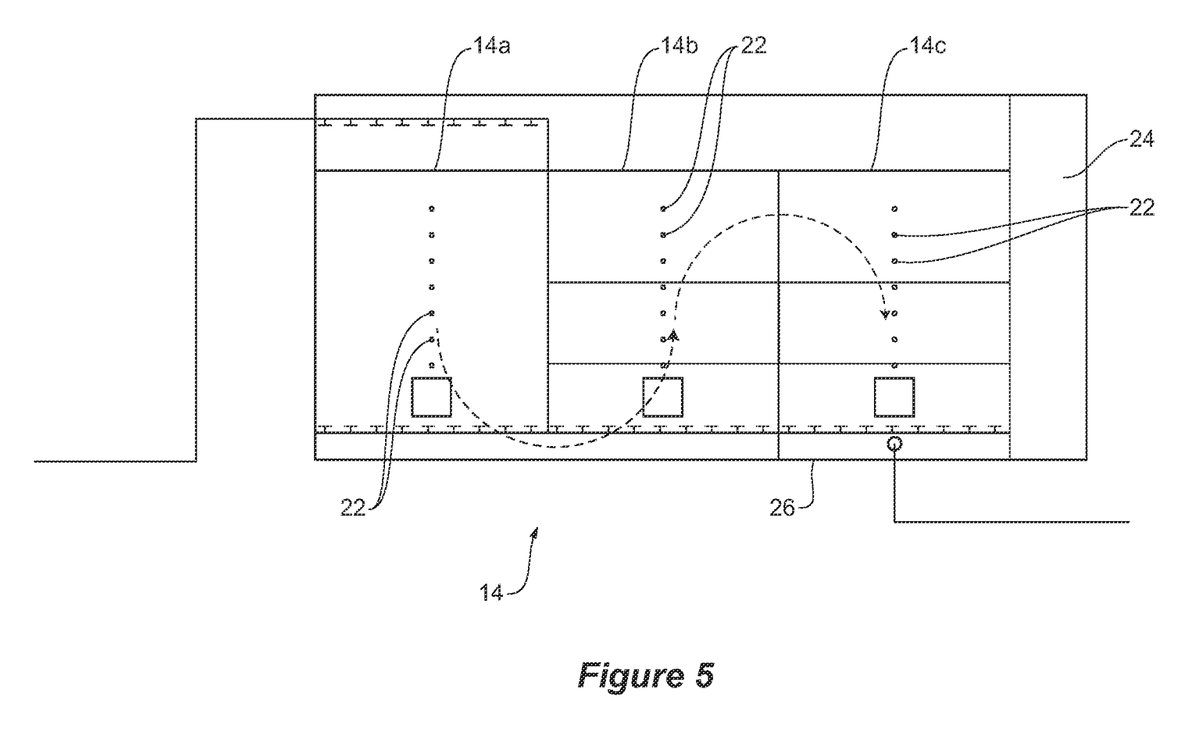
FIG. 5 is a schematic diagram of a sorbent module of a water treatment system according to embodiments of the disclosure.

In an alternative embodiment illustrated in FIG. 5, the sorption module 14 comprises three sorption units 14a, 14b, and 14c. The sorption units 14a, 14b and 14c are connected in series. The partially purified water stream 18 runs through the sorption units 14a, 14b and 14c in series to increase sorbent contact with the water. The sorption module 14 is contained in a housing 26, such as a shipping container. The sorption module 14 in these embodiments has three zones with each zone provided by each of the respective sorption units 14a, 14b and 14c. The primary zone or sorption unit 14a removes 60-80% PFAS, the secondary zone or sorption unit 14b removes the remaining PFAS and the third zone or sorption unit 14c is an emergency/safety zone that does not typically capture any PFAS as it should be all removed. An advantage of the sorption module 14 shown in FIG. 5 is that it can be uncoupled from the water treatment system 10 and the entire containerised sorption module 14 can be removed and this means that contaminated carbon is not transferred onsite. The contaminated carbon transfer can then be carried out in a controlled environment.

In the sorption module 14 illustrated in FIG. 5, each sorption unit 14a, 14b, and 14c has a series of sampling ports 22 positioned along the length of the unit and, hence, along the length of the carbon bed in each unit. This enables the carbon bed to be sampled in many locations to ensure there will never be a PFAS break through. The sampling ports 22 are connected to sampling probes which are, in turn, connected to a sample and instrument board 24.

Advantageously, the carbon in the sorption units 14a, 14b, etc can be layered or graded in size from an inlet to an outlet end of each unit. Finer mesh size carbon has a better removal rate and therefore the inlet end of each unit has fine layers at the top and the mesh size increases towards the outlet end. The carbon used may be selected from carbon having US mesh size 6×10, 6×12, 6×16, 8×14, 8×16, 8×20, 8×30, 12×30, 12×40, 20×40, 20×50, 50×150, 50×200, and 80×325.

PFAS adsorb to the sorbent material when the partially purified water stream 18 is in contact with the sorbent material. As used herein, the term "adsorption" or similar terms means the adhesion of ions or molecules from a gas or liquid to a surface.

PFAS that adsorb to the sorbent material include, but are not limited to, perfluorooctanoic acid (PFOA), perfluorooctane sulfonate (PFOS), perfluorononanoic acid (PFNA), perfluorohexane sulfonic acid (PFHxS), perfluorohexanoic acid (PFHxA), and perfluorobutanesulfonic acid (PFBS).

Contact of the partially purified water stream 18 with the sorbent material in the, or each, sorption unit 14a results in the removal of substantially all PFAS contaminants from the partially purified water stream 18. As used herein, the term "removal of substantially all . . . contaminants" and similar terms means that the concentration of the contaminant is reduced by at least 50%, such as by 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100%.

The sorbent material in the, or each, sorption unit 14a will eventually become loaded with high concentrations of PFAS requiring regeneration of the sorbent materials or replacement. The sorbent material may be regenerated to release the PFAS from the "spent" sorbent materials.

The components of the water treatment system 10 are in fluid communication with one another. The components of the water treatment system 10 may be connected using tubes, pipes, joints and junctions known in the art. For example, the components may be connected using PVC pipes, joints and junctions, such as DN15, DN20, DN25, DN50, DN80, DN100, DN150, DN200, DN300 PVC pipe.

Water flow through the components of the water treatment system 10 can be controlled using suitable pumps and valves as is known in the art. The pumps and valves may be controlled by a control system.

Figure 2:
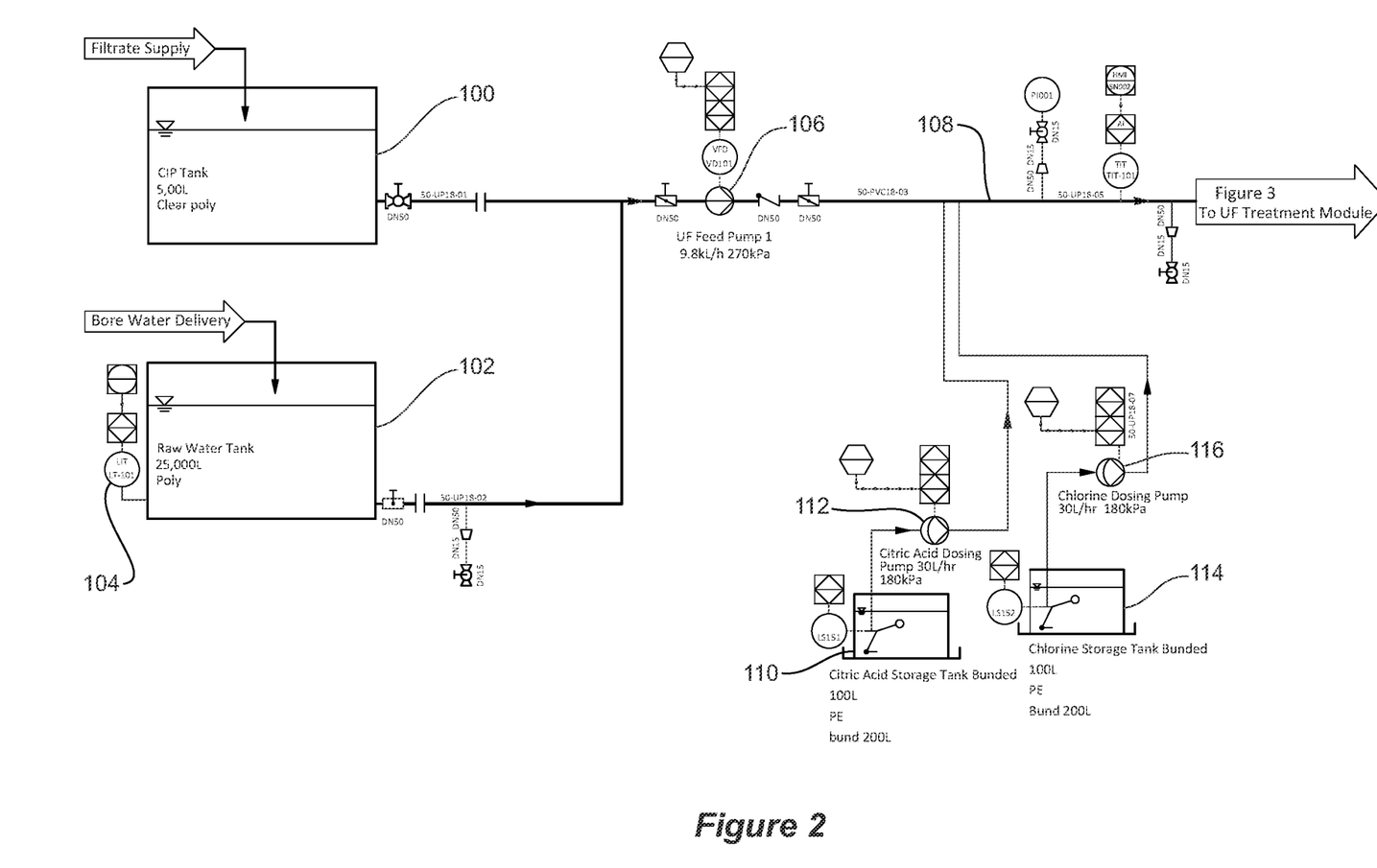
FIG. 2 is a schematic diagram of an upstream section of a water treatment system according to embodiments of the disclosure.

An embodiment of the water treatment system 10 is shown in detail in FIGS. 2 to 4. As shown in FIG. 2, the water treatment system 10 comprises a filtrate tank 100 and a raw water tank 102. A level indicator 104 is connected to the raw water tank 102 and provides the control system with feedback on the water level in the raw water tank 102. Both tanks 100 and 102 are connected to a feed pump 106 and a feed line 108. A citric acid storage tank 110 and pump 112 and a chlorine storage tank 114 and pump 116 are each connected to the feed line 108 and are used to dose the feed water supply with citric acid and chlorine, respectively. The pumps 112 and 116 are controlled by the control system and are used to dose the feed water with citric acid and/or chlorine for the chemically enhanced backwash (CEB).

The feed line 108 supplies feed water to the filtration module 12 which is shown in detail in FIG. 3. Water in the feed line 108 passes through a 150 micron inlet screen 118 and then to the filtration units 12a, 12b and 12c. The filtration units 12a, 12b and 12c are connected to an air blower 120 which supplies air to the units 12a, 12b and 12c for the air scouring process. The filtration module 12 has a waste outlet line 122 and a partially purified water stream line 124. Passage of water to the lines 122 and 124 is controlled by valves and the control system depending on whether the water treatment system 10 is in operating mode, backwash mode or standby.

The partially purified water stream line 124 supplies partially purified water 18 to the sorbent module 14 (FIG. 4).

The illustrated water treatment system 10 is programmed with Critical Control Points (CCP) to alarm and shut down the system if any CCPs are not met. The following control measures are as follows:
High or Low Treated Water pH;
High Filtrate Turbidity;
High Transmembrane Pressure;
Integrity Test Failure.
Filtration Module 12 Operation
The UF operation has the following sequences:
Standby;
Service Mode;
Backwash Mode;
CEB (Chemical Enhanced Backwash);
CIP Mode (Manual);
Integrity Test.
Standby Mode
Standby mode occurs when the level in the raw water tank 102 is below the stop set point:
Stop UF Feed Pump (PU-101;
Close Feed Water Valve (VA-102);
Close Filtrate Valve (VA-201, VA-204);
Open Forward Flush Valve (VA-202, VA-206);
Close Waste Valve (VA-203, VA-205).
Service Mode
Service mode is the sequence where filtrate is produced by passing the raw water through a series of UF membranes 12a, 12b, etc to the treated water tank.
When the level (LT101) in the raw water tank 102 reaches its start level set point (adjustable via set points page) the filtration sequence (service mode) will start.
When the filtration sequence is started, the following will occur. Filtration is run on a timed sequence (adjustable via set points page, default 30 minutes);
Open feed water inlet valve (VA-102);
Open filtrate outlet valve (VA-201);
Close forward flush valve (VA-202, VA-206);
Close waste valve (VA-203, VA-205);
Start UF Feed pump (PU-101) or (PU-102) Duty standby;
Start Chlorine dosing pump (PU-105) controlled by Chlorine Analyzer (CL-301);
When the level (LT101) in the raw water tank 102 reaches its stop level set point the filtration sequence (service mode) will stop and go into standby mode;
Actuated valves change to standby position.
If feed inlet valve (VA-102) fails to open, service mode will cease and an alarm will be raised "VA-102 failed to open".
If filtrate valve (VA-201) fails to open, service mode will cease and an alarm will be raised "VA-201 failed to open".

If raw water pump (PU-101) or (PU-102) has run for 30 seconds (operator adjustable) and Flow is not detected by the flow switch FS201 the system will raise an alarm 'No Flow through Filters fault" and the system will suspend operation.

If raw water pump (PU-101) or (PU-102) has run for 30 seconds (operator adjustable) and Flow is not detected by the Flow meter FT201 the system will raise an alarm 'No Flow fault" and the system will suspend operation.

If pressure transmitter (PT-201) exceeds 180 KPA (operator adjustable) then system ceases operation and a backwash sequence is activated.

If pressure transmitter (PT-201) reaches 250 KPA (operator adjustable) then system ceases operation and a critical alarm activated.

Backwash Sequence
The Backwash Sequence uses water from the raw water tank 102 to clean the membranes, this has the following steps:
Air Scour;
Drain Down;
Forward Flush;
Filtrate Flush.
Air Scour
Air is injected from the blower on the filtrate side of the membrane to vibrate the membrane material to break up the dirt.
Open forward flush valve (VA-202);
Once the above has occurred, start Blower (BL201) and open air valve (VA-207) this sequence will run for 2 minutes (operator adjustable).
If forward flush valve (VA-202) fails to open, backwash sequence will cease, and an alarm will be raised "VA-202 failed to open".
If air is not detected by the air switch when the blower is running, backwash sequence will cease, and an alarm will be raised "Blower No Air".
Drain Down
This sequence drains all the water from the membranes and sends it to waste. The blower remains running to loosen the debris, this sequence will run for approx. 2 minutes (operator adjustable).
Forward flush valve (VA-202) remains open;
Open Waste valve (VA-203).
If waste valve (VA-203) fails to open, backwash sequence will cease and an alarm will be raised "VA-202 failed to open".
If air is not detected by the air switch when the blower is running, backwash sequence will cease and an alarm will be raised "Blower No Air".
Forward Flush
Forward flush is a short sequence to flush the raw water from the feed pipework after a backwash and remove air from the system.
Open Feed valve (VA-102);
Open Forward flush valve (VA-202);
Close Waste valve (VA-203);
Close Filtrate valve (VA-201).
Once the above has occurred, start raw water pump (PU-101) or (PU-102) this sequence will run for 2 minutes (operator adjustable).
Filtrate Flush
At the end of the Forward Flush cycle (for approx. 1 minute, operator adjustable) the filtrate flush valve (VA-204) is opened (VA-202 is closed) to flush debris to waste before service mode is started again. Once completed the feed pump is stopped.

Once backwash is complete the system returns to service mode.

CEB Mode

CEB mode (Chemical Enhanced Backwash) is an automated process that is initiated after a set number of backwash cycles. (operator adjustable). The CEB is only required when treating poor quality feed water and can be disabled. The CEB cycle is like the backwash cycle except during the forward flush sequence, acid is dosed into the feed pipe and then a Soak sequence is added to clean the membranes. (approx. 30 minutes, operator adjustable)

Start Backwash Sequence, Air Scour, Drain down;
During Forward flush—monitor pH and run Acid dosing pump (PU-103) to keep pH around 3-4. (Note Filtrate Flush is not initiated in this cycle);
Once filters are full (determined by time, operator adjustable) the feed pump stops;
Close Forward Flush Valve (VA-202);
Let soak occur for 30 minutes (operator adjustable);
Once soak time has elapsed Start the Backwash Sequence Air Scour, Drain Down, Forward Flush and Filtrate Flush.
During this cycle, all water goes to chemical waste which is stored in a separate tank.

The sequence is as follows:
Air Scour CEB
Open forward flush valve (VA-206);
Once the above has occurred, start blower (BL201) and open air valve (VA-207) this sequence will run for 2 minutes (operator adjustable).
Drain Down CEB
Forward flush valve (VA-206) remains open;
Open waste valve (VA-205).
Forward Flush CEB
Open Feed valve (VA-102);
Open CEB flush valve (VA-206);
Close CEB Waste valve (VA-205);
Close Filtrate valve (VA-201).
Once the above has occurred, start raw water pump (PU-101) or (PU-102) this sequence will run for 2 minutes (operator adjustable).
Filtrate Flush
At the end of the forward flush cycle (for approx. 20 seconds, operator adjustable) the filtrate flush valve (VA-204) is opened (VA-202 is closed) to flush debris to waste before service mode is started again. Once completed the feed pump is stopped.

Once backwash is complete the system returns to service mode.

CIP Mode

CIP mode is a manual process that is controlled by site attendance. To carry out a CIP clean the following is manually operated:

Open manual Backwash valve;
Open Forward Flush valve (VA-202);
Start Feed pump (PU-101).
If pressure transmitter (PT-101) elevates above 250 KPA the feed pump will cease and a warning alarm "open Forward Flush manual valves". If the pressure drops below 50 KPA the warning alarm will automatically reset.

Integrity Test

This test is carried out daily to check the performance of the membranes. If the test fails then the system is shut down and a critical alarm is sent.

Set system to Standby, Close all valves
Open Forward Flush valve (VA-202)
Open Air solenoid (VA-207) for 1:30 minutes (operator adjustable)
Monitor filter pressure PT-202, need to exceed 105 KPA and remain above 100 KPA within that minute (operator adjustable).
Close (VA-207) and start test:
Monitor PT-202 for 5 minutes (operator adjustable);
If pressure drops more than 12 KPA in 5 minutes (operator adjustable) the test fails;
The system then Stops and will require a manual "Reset".
If filters Pass the test then the system goes into backwash.
Once backwash is complete the system returns to service mode.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A process for decontaminating PFAS contaminated water, comprising:
passing PFAS contaminated surface water, groundwater, bore water, river water, or creek water having a total PFAS concentration of less than 1 ppm through three to thirty ultrafiltration membranes connected in parallel under conditions to remove one or more non-PFAS contaminant from the PFAS contaminated water to provide partially purified water containing soluble PFAS contaminants; and
directly passing the partially purified water through at least one sorption unit comprising a sorbent material under conditions to remove substantially all PFAS contaminants from the partially purified water to provide purified water that is substantially free from PFAS contamination.

2. The process of claim 1, wherein the process is configured to treat up to 2,000 KL/day over a 24-hour period.

3. The process of claim 1, wherein one or more of the ultrafiltration membranes have a pore size of about 0.08 μm.

4. The process of claim 1, wherein one or more of the ultrafiltration membranes have a hollow fibre configuration.

5. The process of claim 1, wherein one or more of the ultrafiltration membranes is/are a polyvinylidene fluoride (PVDF) membrane.

6. The process of claim 1, wherein the process comprises backwashing one or more of the ultrafiltration membranes.

7. The process of claim 6, wherein backwashing comprises air scouring.

8. The process of claim 6, wherein backwashing comprises a chemically enhanced backwash (CEB).

9. The process of claim 1, wherein the at least one sorption unit comprises five sorption units connected in series.

10. The process of claim 1, wherein retention time for water in the at least one sorption unit is at least 25 to 30 minutes EBCT.

11. The process of claim 1, wherein the sorbent material is activated carbon.

* * * * *